(12) United States Patent
Heimerikx et al.

(10) Patent No.: US 7,247,664 B2
(45) Date of Patent: *Jul. 24, 2007

(54) BITUMINOUS COMPOSITION WITH IMPROVED 'WALK-ON-ABILITY' AND ITS USE IN ROOFING APPLICATIONS

(75) Inventors: Gerardus Wilhelmus Jozef Heimerikx, Amsterdam (NL); Erik Adrianus Theunis Trommelen, Amsterdam (NL)

(73) Assignee: Kraton Polymers U.S. LLC, Houston, TX (US)

( * ) Notice: Subject to any disclaimer, the term of this patent is extended or adjusted under 35 U.S.C. 154(b) by 2 days.

This patent is subject to a terminal disclaimer.

(21) Appl. No.: 11/151,111

(22) Filed: Jun. 13, 2005

(65) Prior Publication Data

US 2005/0233664 A1   Oct. 20, 2005

Related U.S. Application Data

(63) Continuation of application No. 10/655,668, filed on Sep. 5, 2003, now Pat. No. 6,949,593, which is a continuation-in-part of application No. 10/381,607, filed as application No. PCT/EP01/11305 on Sep. 28, 2001, now abandoned.

(30) Foreign Application Priority Data

Sep. 28, 2000  (EP) ................... 00308546

(51) Int. Cl.
   *C08L 95/00* (2006.01)
(52) U.S. Cl. .............. 524/68; 524/70; 524/71
(58) Field of Classification Search ........... 524/68, 524/70–71
   See application file for complete search history.

(56) References Cited

U.S. PATENT DOCUMENTS

| | | | |
|---|---|---|---|
| 3,231,635 A | 1/1966 | Holden et al. | |
| 3,251,905 A | 5/1966 | Zelinski | |
| 3,390,207 A | 6/1968 | Moss et al. | |
| 3,598,887 A | 8/1971 | Darcy et al. | |
| 4,219,627 A | 8/1980 | Halasa et al. | |
| 4,247,427 A | 1/1981 | Edinger | |
| 4,485,201 A | 11/1984 | Davis | |
| 4,755,545 A | 7/1988 | Lalwani | |
| 4,923,913 A | 5/1990 | Chich et al. | |
| 4,994,508 A | 2/1991 | Shiraki et al. | |
| 5,141,986 A | 8/1992 | Southwick et al. | |
| 5,189,083 A | 2/1993 | Gelles et al. | |
| 5,212,220 A | 5/1993 | Gelles | |
| 5,326,798 A | 7/1994 | Danese | |
| 5,451,619 A | 9/1995 | Kluttz et al. | |
| 5,718,752 A | 2/1998 | Kluttz | |
| 5,798,401 A | 8/1998 | Korenstra et al. | |
| 5,854,335 A | 12/1998 | Heimerikx et al. | |
| 6,607,679 B2 | 8/2003 | Handa et al. | |
| 6,720,376 B2 | 4/2004 | Itoh et al. | |
| 6,949,593 B2 * | 9/2005 | Heimerikx et al. | 524/68 |

FOREIGN PATENT DOCUMENTS

| | | |
|---|---|---|
| EP | 0 006 674 | 1/1980 |
| EP | 0 238 149 | 9/1987 |
| EP | 0 317 025 | 5/1989 |
| EP | 0 387 671 | 9/1990 |
| EP | 0 413 294 | 2/1991 |
| EP | 0 506 195 | 9/1992 |
| EP | 0 636 654 | 2/1995 |
| EP | 0 728 814 | 8/1996 |
| GB | 1 538 266 | 1/1979 |
| WO | 94/11443 | 5/1994 |
| WO | 94/22931 | 10/1994 |
| WO | 96/37545 | 11/1996 |

* cited by examiner

*Primary Examiner*—Peter Szekely
(74) *Attorney, Agent, or Firm*—Donna Holguin; Novak, Druce & Quigg

(57) ABSTRACT

Disclosed is a bituminous composition that comprises a bituminous component (A), an elastomer component (B), preferably a block copolymer of a conjugated diene and a monovinylaromatic hydrocarbon, and an additive (C), wherein the additive is a compound of the general formula $$Ar-R-Ar \qquad (I)$$

wherein each "Ar" independently is a benzene ring or fused aromatic ring system of 6 to 20 carbon atoms, substituted by at least one hydroxyl group, and "R" is an optionally substituted divalent radical comprising 6 to 20 atoms in the backbone and at least one amide and/or ester group in the backbone. These compositions are disclosed to be particularly useful in the preparing and repair of roofing.

18 Claims, 1 Drawing Sheet

Indentation (76 kPa) versus the concentration of MD-1024. Indentation is measured at the indicated times (seconds).

Resistance to deformation.

BITUMINOUS COMPOSITION WITH IMPROVED 'WALK-ON-ABILITY' AND ITS USE IN ROOFING APPLICATIONS

CROSS-REFERENCE TO RELATED APPLICATIONS

The present application is a continuation of commonly assigned U.S. patent application Ser. No. 10/655,668, having the same title and filed 5 Sep. 2003 (now U.S. Pat. No. 6,949,593), which is a continuation in part of commonly assigned U.S. patent application Ser. No. 10/381,607, having the same title and filed Aug. 6, 2003 (now abandoned); which Application claims priority from PCT Application Number PCT/EP01/11305, filed 28 Sep. 2001; which Application claims priority from European Patent Application Number EP 00308546.1 filed 28 Sep. 2000.

BACKGROUND OF THE INVENTION

1. Field of the Invention

The present invention relates to bituminous compositions. The present invention particularly relates to bituminous compositions including an elastomer component.

2. Background of the Art

A major proportion of the roofing felts applied nowadays are made of modified bituminous compositions, e.g., bituminous compositions comprising a bitumen component and an elastomer component, typically a styrenic block copolymer such as SBS (polystyrene-polybutadiene-polystyrene) SEBS (polystyrene-poly[ethylene-butylene]-polystyrene); SIS (polystyrene-polyisoprene-polystyrene) and SEPS (polystyrene-poly[ethylene-propylene]-polystyrene) and the like. Advantages of modified bituminous compositions over traditional systems (blown bitumen) include: improved fatigue resistance (the accommodation of repeated thermal movements of the roof); improved flexibility (especially at low temperature, enabling contractors to lay felt under colder weather conditions than with conventional bitumen); improved strength (to allow a reduction in the number of plies of felt by replacing in whole or part the traditional blown bitumen coated system); improved resistance to (permanent) deformation at short and longer loading times (so-called 'walk-on-ability'); and improved elasticity, resulting in a greater capacity to bridge movement of crack and joints.

Although modified bituminous compositions satisfy all of the above requirements in as much as these materials having excellent high and low temperature properties (i.e. cold bending resistance at −30 to −25° C. and flow resistance at 80 to 100° C.), improvement is still desired.

A property of particular importance in roofing applications is the walk-on-ability mentioned before. In case of inadequate walk-on-ability, torching, which is one of the most widely used application methods for bituminous roofing felts, could lead to undesired surface effects and/or damage due to insufficient resistance to deformation. An assessment of the resistance of a composition to withstand such working traffic is currently ranked by the penetration value (ASTM D5-94) at 50° C. A reduction in PEN value, i.e. improving the resistance to deformation, whilst maintaining the performance properties and especially the low temperature properties would be highly desirous.

It has now been found that walk-on-ability of modified bituminous compositions may be improved without (significant) effect on the other performance properties of the compositions. As a result, modified bituminous compositions with an improved balance of properties are now available. Alternatively, modified bituminous compositions may now be made of relatively soft bitumen, that would otherwise have insufficient walk-on-ability (too high PEN value).

SUMMARY OF THE INVENTION

In one aspect, the present invention is a bituminous composition comprising a bituminous component (A), an elastomer component (B), and an additive (C), wherein the additive is a compound having the general formula:

Ar—R—Ar    (I)

wherein each "Ar" independently is a benzene ring or fused aromatic ring system of 6 to 20 carbon atoms, substituted by at least one hydroxyl group, and "R" is an optionally substituted divalent radical comprising 6 to 20 atoms in the backbone and at least one amide and/or ester group in the backbone.

In another aspect, the present invention is a composition useful for preparing or repairing roofs comprising a bituminous component (A), an elastomer component (B), and an additive (C), wherein the additive is a compound having the general formula:

Ar—R—Ar    (I)

wherein each "Ar" independently is a benzene ring or fused aromatic ring system of 6 to 20 carbon atoms, substituted by at least one hydroxyl group, and "R" is an optionally substituted divalent radical comprising 6 to 20 atoms in the backbone and at least one amide and/or ester group in the backbone.

In still another aspect, the present invention is a process for preparing a bituminous composition comprising admixing a bituminous component (A), an elastomer component (B), and an additive (C), wherein the additive is a compound of the general formula:

Ar—R—Ar    (I)

wherein each "Ar" independently is a benzene ring or fused aromatic ring system of 6 to 20 carbon atoms, substituted by at least one hydroxyl group, and "R" is an optionally substituted divalent radical comprising 6 to 20 atoms in the backbone and at least one amide and/or ester group in the backbone.

Another aspect of the present invention is a process for preparing or repairing roofs comprising using a composition comprising a bituminous component (A), an elastomer component (B), and an additive (C), wherein the additive is a compound having the general formula:

Ar—R—Ar    (I)

wherein each "Ar" independently is a benzene ring or fused aromatic ring system of 6 to 20 carbon atoms, substituted by at least one hydroxyl group, and "R" is an optionally substituted divalent radical comprising 6 to 20 atoms in the backbone and at least one amide and/or ester group in the backbone and the elastomer component and the additive are admixed with each other prior to being admixed with the bituminous component for preparing or repairing the roofs.

BRIEF DESCRIPTION OF THE FIGURES

For a detailed understanding and better appreciation of the present invention, reference should be made to the following detailed description of the invention and the preferred embodiments, taken in conjunction with the accompanying figures, wherein.

DETAILED DESCRIPTION OF THE PREFERRED EMBODIMENTS

Figure 1:
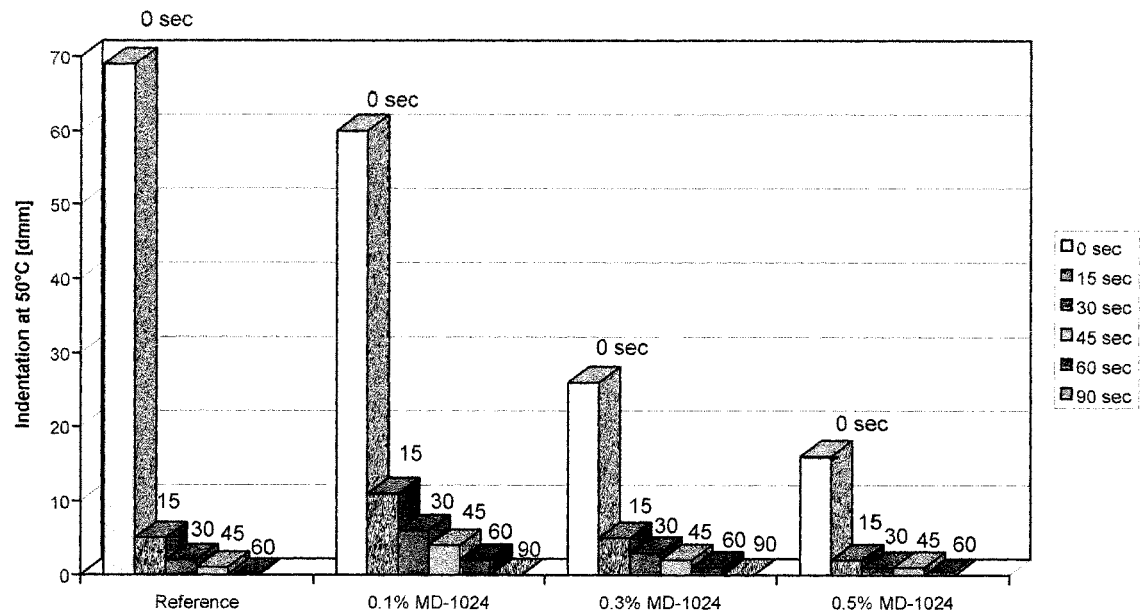
FIG. 1 is a graph showing the relationship between indention and the concentration of MD 1024 additive in a bitumen composition.

The components of the bituminous composition will be described hereafter.

Additive

The additive used in the present invention is a compound of the general formula:

Ar—R—Ar  (I)

wherein each "Ar" independently is a benzene ring or fused aromatic ring system of 6 to 20 carbon atoms, substituted by at least one hydroxyl group, and "R" is an optionally substituted divalent radical comprising 6 to 20 atoms in the backbone and at least one amide and/or ester group in the backbone.

Suitably, each "Ar" is a benzene ring or a fused aromatic ring system of 6 to 10 carbon atoms, preferably a benzene ring. The benzene ring or fused aromatic ring system is substituted by at least one hydroxyl group, although more hydroxyl groups may be present. Suitably, the hydroxyl group or one of the hydroxyl groups is substituted in the para, or 4-position. In addition, each "Ar" may independently carry one or more substituents, preferably alkyl groups of 1 to 10 carbon atoms, most preferably at a position or positions adjacent to hydroxyl group(s). Most suitably, both "Ar" are 3,5-dialkyl-4-hydroxylphenyl groups, preferably 3,5-di-tert-butyl-4-hydroxylphenyl groups.

The divalent radical "R" may be represented by the general formula:

~~~[C(=O)X]n~~~  (II)

wherein "C(=O)X" represents an amide or ester group, "X" being an oxygen or nitrogen atom, preferably an amide group; and "n" the number of such groups. These groups, in case "n" equals 2 or more, may be adjacent to each other but need not be. Suitably, "n" may vary from 1 to 4. Preferably "n" is 2 or 4, most preferably 2. Preferred examples of radical "R" include:

—R$^1$XC(=O)C(=O)XR$^1$—  (III)

—R$^1$XC(=O)—R$^2$—C(=O)XR$^1$—  (IV)

—R$^1$C(=O)X—R$^2$—XC(=O)R$^1$—  (V), and

—R$^1$XC(=O)—R$^2$—XC(=O)R$^1$—  (VI), wherein "R$^1$" is a C1-4 hydrocarbonylene group, preferably an ethylene group; "X" is as defined above; and "R$^2$" is an organic bridging group of 1 to 10 atoms in its backbone or a substituted organic bridging group of 1 to 10 atoms in its backbone, such as a C1-10 hydrocarbonylene group, preferably a n-hexylene group, or a group of such length containing two amide or ester groups, preferably amide groups in its bridge.

In case "R$^2$" is substituted, then it may be substituted with one or more of a variety of substituents, including alkaryl groups carrying an "Ar" group, and the like.

The preferred additive may hence be selected from, e.g., IRGANOX® MD-1024; IRGANOX 1098; IRGANOX 259 or NAUGARD® XL-1 and the like. Also a combination of such additives may be used. The most preferred additive is bis(3,5-ditertbutyl-4-hydroxyphenylethylamino)dicarbonic acid amide, available as MD-1024 from Ciba-Geigy.

The additive may be added in any amount in the range of 0.01 to 5% wt, typically in an amount of 0.1 to 2% wt, based on total bituminous composition. The preferred amount depends on e.g. (I) the selected additive(s); (II) the ratio of elastomer component (B) versus bitumen component (A); (III) the nature of elastomer component (B) and of bitumen component (A); and (IV) the presence of other components, such as fillers. Nonetheless, little experimentation will be required to find a suitable amount of additive to improve the overall balance of properties of the bituminous composition.

Bitumen

The bituminous component present in the bituminous compositions according to the present invention may be a naturally occurring bitumen or derived from a mineral oil. Also petroleum pitches obtained by a cracking process and coal tar can be used as the bituminous component as well as blends of various bituminous materials. Examples of suitable components include distillation or "straight-run bitumens", precipitation bitumens, e.g. propane bitumens, blown bitumens, e.g. catalytically blown bitumen or multigrade, and mixtures thereof. Other suitable bituminous components include mixtures of one or more of these bitumens with extenders (fluxes) such as petroleum extracts, e.g. aromatic extracts, distillates or residues, or with oils. Suitable bituminous components (either "straight-run bitumens" or "fluxed bitumens") are those having a penetration of in the range of from 50 to 250 dmm at 25° C. Generally a straight run or distilled bitumen having a penetration in the range of from 100 to 250 dmm will be the most convenient to use. Within the scope of the invention, bitumens of different level of compatibility may be used.

Elastomer

The bituminous composition according to the invention contains at least one elastomer component (B). Elastomers are generally associated with polymers of dienes, such as butadiene or isoprene, or with copolymers of such dienes with a monovinylaromatic hydrocarbon, such as styrene. It is emphasized that the elastomer used in the composition of the invention is not restricted to such polymers or copolymers. Suitable elastomers include polyesters, polyacrylates, polysulfides, polysilicones and polyesteramides, provided they show an elastomer behaviour.

Preferably, at least one block copolymer comprising at least two terminal blocks of a poly(monovinylaromatic hydrocarbon) and at least one block of one or more conjugated dienes or a (partially) hydrogenated version thereof is used as elastomer component. Suitable conjugated dienes are those with from 4 to 8 carbon atoms per monomer, for example butadiene, 2-methyl-1,3-butadiene (isoprene), 2,3-dimethyl-1,3-butadiene, 1,3-pentadiene and 1,2-hexadiene, in particular butadiene and isoprene, and mixtures thereof. Suitable monovinylaromatic hydrocarbons are o-methyl styrene, p-methyl styrene, p-tert-butylstyrene, 2,4-dimethylstyrene, a-methylstyrene, vinyl naphthalene, vinyl toluene, vinyl xylene, and the like or mixtures thereof, and in particular styrene.

These block copolymers may be linear or branched, and symmetric or asymmetric. A preferred example of a suitable block copolymer is the triblock copolymer of the configuration A-B-A, in which "A" represents a polyvinylaromatic hydrocarbon block, and "B" represents a polydiene block. These block copolymers may be further defined e.g. by the content of monovinylaromatic hydrocarbons in the final block copolymer, their molecular weight and their microstructure, as discussed hereinafter.

The content of monovinylaromatic hydrocarbons of the final block copolymer suitably ranges from 10 to 70, more preferably from 20 to 50% wt (based on the total block copolymer).

The polymer blocks of monovinylaromatic hydrocarbons ("A") advantageously have an apparent molecular weight in the range from 2,000 to 100,000, in particular from 5,000 to 50,000. The polymer blocks of conjugated dienes ("B") preferably have an apparent molecular weight in the range of from 25,000 to 1,000,000, particularly from 30,000 to 150,000.

With the term "apparent molecular weight" as used throughout the specification is meant the molecular weight of the polymer (block), as measured with gel chromatography (GPC) using polystyrene calibration standards (according to ASTM 3536).

Through modification of the polymerization, it is possible to direct the conjugated dienes to propagate in a manner wherein the carbon atoms of a single unsaturated bond are incorporated in the backbone, or in a manner wherein all carbon atoms of the unsaturated conjugated bonds are incorporated in the backbone. With respect to the former manner, poly(conjugated dienes) are defined by their vinyl content, referring to the unsaturated bond that is now attached alongside the polymer backbone.

Techniques to enhance the vinyl content of the conjugated diene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxypropane, 1-ethoxy-2,2-tert-butoxyethane, of which 1,2-diethoxypropane is most preferred.

Suitably, the total vinyl content of the block copolymer is at least 6% wt (based on the blocks of poly(conjugated diene)), preferably in the range of from 8 to 80, more preferably in the range of from 25 to 55% wt.

The preparation of block copolymers is known in the art. In GB1538266 a number of methods are described. For example, block copolymers may be prepared by coupling at least two diblock copolymer molecules together, using suitable coupling agents such as adipates (e.g., diethyl adipate) or silicon-compounds (e.g., silicon tetrachloride, dimethyldichlorosilane, methyldichlorosilane or gamma-glycidoxypropyl-trimethoxysilane) or a nucleus prepared by oligomerization of di- or tri-vinyl benzene. Other coupling agents can be selected from polyepoxides, such as epoxidized linseed oil, or epoxidized bisphenols (e.g. the diglycidylether of bisphenol A), polyisocyanates (e.g., benzo-1,2,4-triisocyanate), polyketones (e.g., hexane-1,3,6-trione), polyanhydrides or polyhalides (e.g., dibromoethane) and the like.

Using coupling agents, a residue of uncoupled diblock copolymer may remain in the final product, referred to as the "diblock content". Where the block copolymer is prepared via a technique where no diblock is specifically prepared or isolated, such as in full sequential preparation, it is known that the final amount of diblock can be adjusted e.g. by reinitiation. The diblock content may for instance be in the range of from 5 to 25% wt and more preferably from 10 to 25% wt, based on the elastomer component.

The hydrogenation of the block copolymer, if desired, may be carried out as described in the above British Patent Specification. Further examples of suitable block copolymers, and their preparation, may be found for instance in EP0006674; EP0238149; EP0667886; EP0317025; EP0506195; EP0756611; U.S. Pat. Nos. 5,189,083; 5,212,220; 5,141,986; 544,775; 5,451,619; 5,718,752; 5,854,335; 5,798,401; 3,231,635; 3,251,905; 3,390,207; 3,598,887 4,219,627; EP0413294; EP0387671; EP0636654; and WO0422931, all included herein by reference.

Elastomer component (B) is suitably present in the bituminous composition in an amount in the range of from 2 to 20, more preferably from 10 to 15% wt (based on the total bituminous composition).

Additional Components

The bituminous composition may also, optionally, contain other ingredients such as may be required for the end-use envisaged. Thus fillers may be included, for example talc, calcium carbonate and carbon black. Other components that may be incorporated include resins, oils, stabilisers or flame retardants. The content of such fillers and/or other components may be in the range of from 0 to as much as 40% wt (based on the total bituminous composition). Of course, if advantageous, other polymer modifiers may also be included in the bituminous composition of the invention.

The useful low temperature and high temperature properties of the polymer-bitumen blends of the present invention coupled with the improved ageing resistance enables such blends to be of significant benefit in uses where the blends are exposed to external weather conditions, such as use in roofing applications, for example as a component of roofing felt. The usefully low high-temperature viscosity not just means that the polymer-bitumen blends can be more easily processed but also means that they enable a greater amount of filler to be incorporated before the maximum allowable processing viscosity is achieved, and thus leads to a cheaper product in those applications where fillers are commonly used.

Combining the Components

The components of the compositions of the present invention can be combined in way known to those of ordinary skill in the art of preparing bituminous compositions to be useful. For example, the bitumen, additive and elastomer can be combined sequentially. In an alternative embodiment of the present invention, the elastomer and additive can first be admixed, and then the combination of elastomer and additive can then be admixed with the bitumen. In a preferred embodiment, the additive can be added to the elastomer during elastomer production.

EXAMPLES

The following examples are provided to illustrate the present invention. The examples are not intended to limit the scope of the present invention and they should not be so interpreted. Amounts are in weight parts or weight percentages unless otherwise indicated.

Bituminous Compositions

Master batches with 12% wt KRATON® D-1184 (a commercial SBS grade, having an apparent radial MW of 420,000 g/mol, a diblock MW of 120,000 g/mol a PSC of 30% wt and a vinyl content of 8% wt) in two types of commercially available bitumen, i.e. B 45/60, and B 160/210, are made with a SILVERSON® L4R high shear mixer. The bitumen is heated to 160° C. and subsequently the polymer is added. Upon blending, the temperature increases to 180° C., which is caused by the energy input from the mixer. Blending at this temperature is continued until a homogeneous blend is obtained which is monitored by fluorescence microscopy.

With these master batches, bituminous compositions are prepared using the other ingredients under low shear stirring at a temperature of 180° C.

Test Methods

A standard evaluation on the blends without filler, i.e. the determination of softening point, viscosity, DIN flow resistance and cold bend, is carried out.

The penetration at 50° C. of each composition in this study is also determined. The load applied on the surface of a composition during a penetration measurement calculation is as follows:
  the cone tip diameter of the needle used is 0.15 mm (as reported in the calibration report and defined in ASTM D5-94);
  the surface of the needle ($0.25 \times \pi \times d^2$) is 0.0177 mm2;
  the total load applied during the measurement, i.e. the weight (50 g) and bar, amounts 100 g.

Therefore, the actual load is: 100/0.0177=5650 g/mm2=56500 kPa.

The indentation and resilience is determined as follows: if the surface of an average shoe size is 210 cm2 (30×7 cm) and the weight of an average person is 80 kg, the load which is exerted on the roof (80/210=0.394 kg/cm2) is 38 kPa.

The experiments are carried out on the compositions in penetration cups. On the surface of the composition a round flat metal cylinder is placed with a diameter of 1.3 cm. In this study the indentation tests are carried out by applying two different loads, i.e. 0.5 kg and 1 kg. The actual loads exerted upon the compositions are therefore: 38 kPa and 76 kPa.

Creep tests are done for each composition at 50° C. applying various loads. The creep test is performed with a Haake RT20 Rotoviscometer using a parallel plate configuration. The diameter of the upper plate is 8 mm, while the distance between the plates is 1 mm. The initial thickness of the samples used is 1.5 mm. Before the start of the measurement the samples are trimmed. The creep tests are carried out applying a constant load of 40 kPa, 20 kPa, 10 kPa or 5 kPa. The compliance J (1/Pa) as a function of time is been determined for each composition.

Experiments 1-5

IRGANOX MD-1024 is used in this study to investigate its effect on the penetration of typical roofing composition based on standard D-1184 SBS and 30% wt filler.

Results

The results of the penetration tests at 50° C. are given in the Table. The penetration values of the reference composition without the additives present is given for comparison reasons. Furthermore, the typical performance properties of a composition with bitumen B45/60 are also given for comparison reasons.

TABLE

| | Experiment No. | | | | |
|---|---|---|---|---|---|
| | A | 1 | 2 | 3 | B |
| MD-1024, % wt | nil | 0.1 | 0.3 | 0.5 | nil |
| Bitumen (B160/210 or B45/60) | B160/210 | B160/210 | B160/210 | B160/210 | B45/60 |
| Pen at 50° C., dmm | 94 | 99 | 82 | 67 | 66 |
| Indent 50° C., 38 kPa, dmm | 36 | 32 | 12 | 9 | |
| Indent 50° C., 76 kPa, dmm | 69 | 60 | 26 | 16 | |
| R&B, ° C. | 124 | 125 | 123 | 122 | 134 |
| Visco, 180° C., Pa · s | | | | | |
| 20 s$^{-1}$ | 5.2 | 4.9 | 5.9 | 6.6 | 8.1 |
| 100 s$^{-1}$ | 3.7 | 3.9 | 4.6 | 5.6 | 8.5 |
| Cold bend, ° C. pass | −35 | −35 | −40 | −40 | −5 |
| Flow, ° C. pass | 95 | 95 | 95 | 95 | 110 |

CONCLUSION

The presence of MD-1024 significantly affects the penetration of the composition at 50° C. It is also demonstrated that the quantity of the additive influences the level of penetration.

It is demonstrated that with 0.5% wt MD-1024 present in a composition with the softer B160/210 bitumen a similar penetration value at 50° C. is obtained in comparison with that found for a composition with the harder B45/60 bitumen, while significantly better overall performance properties are found for the composition with the softer bitumen.

The penetration at 50° C. was reduced significantly, which suggests that the level of indentation should be improved as well.

The results of the indentation and resilience of the compositions with D-1184 in B160/210 bitumen, filler and additive applying an excessive load of 76 kPa are reported in FIG. 1. The results for the reference composition, i.e. without additive present are also given.

A major improvement of the level of indentation has been established with the presence of the additive, without affecting the resilience. In each case a total recovery within 120 seconds has been observed.

Figure 2:
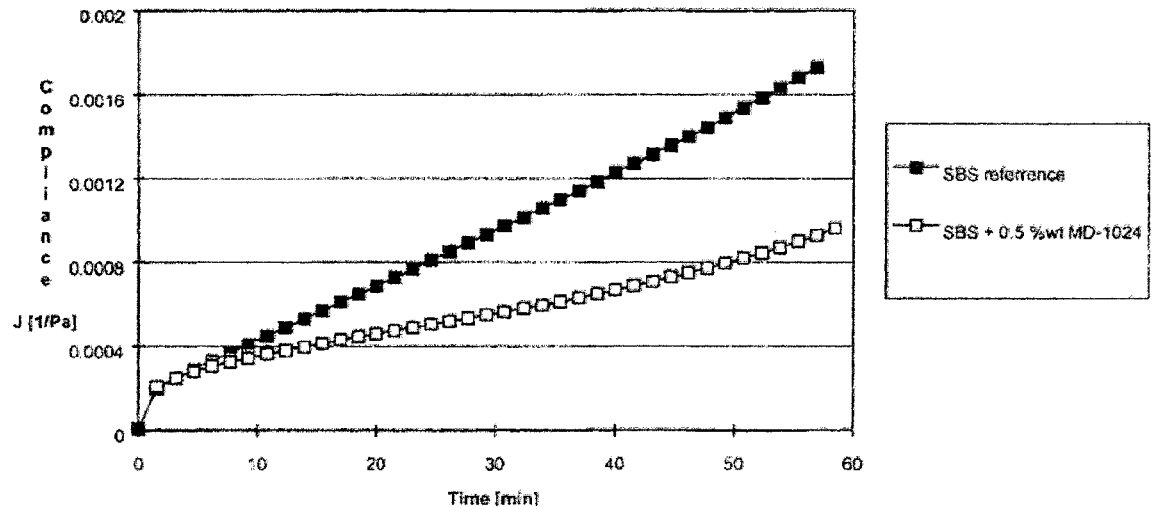
FIG. 2 is graph showing the resistance to deformation of a reference sample and a bituminous composition of the present invention.

With the creep test the resistance to deformation has been determined at 40 kPa at a temperature of 50° C. The results for each composition (B160/210) as reported in Table 1 are given in FIG. 2. With the presence of the additives the resistance to deformation was improved significantly.

If 0.3% wt or even more pronounced 0.5 wt MD-1024 is incorporated in a typical roofing composition the walk-on-ability, i.e. penetration, indentation and resilience and resistance to deformation, can be improved substantially.

What is claimed is:

1. A bituminous composition comprising a bituminous component (A), at least one elastomer component (B) selected from the group consisting of polydienes, copolymers of dienes with a monovinylaromatic hydrocarbon, polyacrylates, polysulfides, polysilicones and polyesteramides having elastomeric behavior, and an additive (C), wherein the additive is a compound having the general formula:

$$Ar-R-Ar \qquad (I)$$

wherein each "Ar" independently is a benzene ring or fused aromatic ring system of 6 to 20 carbon atoms, substituted by at least one hydroxyl group, and "R" is represented by the formula:

$$-R^1C(=O)X-R^2XC(=O)R^1- \quad (V)$$

wherein each "R$^1$" is a C1-4 hydrocarbonylene group, "R$^2$" is a C1-10 hydrocarbonylene group, and "X" is a nitrogen atom; and "n" is an integer having a value from 1 to 4, said elastomer component (B) being present in an amount in the range of from about 2 to about 20% wt and said additive (C) being present in an amount in the range of from about 0.01 to about 5 weight percent, based on the total bituminous composition.

2. The bituminous composition of claim 1 wherein the elastomer component is a block copolymer of a conjugated diene and a monovinylaromatic hydrocarbon.

3. The bituminous composition of claim 1, wherein the bituminous component is naturally occurring bitumen or derived from a mineral oil.

4. The bituminous composition of claim 3, wherein the bituminous component has a penetration in the range of from about 50 to about 250 dmm at 25° C.

5. The bituminous composition of claim 2, wherein the block copolymer used as elastomer component (B) comprises at least two terminal blocks of a poly(monovinylaromatic hydrocarbon) and at least one block of one or more conjugated dienes or a partially hydrogenated version thereof.

6. The bituminous composition of claim 5, wherein the conjugated diene is selected from the group consisting of butadiene, 2-methyl-1,3-butadiene (isoprene), 2,3-dimethyl-1,3-butadiene, 1,3-pentadiene and 1,2-hexadiene, and mixtures thereof.

7. The bituminous composition of claim 6, wherein the monovinylaromatic hydrocarbon is selected from the group consisting of o-methyl styrene, p-methyl styrene, p-tert-butylstyrene, 2,4-dimethylstyrene, α-methylstyrene, vinyl naphthalene, vinyl toluene, vinyl xylene, and mixtures thereof.

8. The bituminous composition of claim 7, wherein the monovinylaromatic hydrocarbon is styrene.

9. The bituminous composition of claim 7, wherein the content of monovinylaromatic hydrocarbons of the block copolymer ranges from about 10 to about 70 weight percent based on the total block copolymer.

10. The bituminous composition of claim 5, wherein the polymer blocks of monovinylaromatic hydrocarbons have an apparent molecular weight in the range from about 2,000 to about 100,000 and the polymer blocks of conjugated dienes have an apparent molecular weight in the range of form about 25,000 to about 1,000,000.

11. The bituminous composition of claim 5, wherein the total vinyl content of the block copolymer is at least 6 weight percent based on the blocks of poly(conjugated diene).

12. The bituminous composition of claim 1 wherein the elastomer component (B) comprises at least two terminal blocks of a poly(monovinylaromatic hydrocarbon) and at least one block of one or more conjugated dienes or a partially hydrogenated version thereof, "R$^1$" is C2 hydrocarbonylene and "R$^2$" is C6 hydrocarbonylene.

13. A roofing felt comprising (i) a bituminous composition comprising a bituminous component (A), at least one elastomer component (B) selected from the group consisting of polydienes, copolymers of dienes with a monovinylaromatic hydrocarbon, polyacrylates, polysulfides, polysilicones and polyesteramides having elastomeric behavior, and an additive (C), wherein the additive is a compound having the general formula:

$$Ar-R-Ar \quad (I)$$

wherein each "Ar" independently is a benzene ring or fused aromatic ring system of 6 to 20 carbon atoms, substituted by at least one hydroxyl group, and "R" is $$-R^1C(=O)X-R^2XC(=O)R^1- \quad (V)$$

wherein "R$^1$" is a C1-4 hydrocarbonylene group, each "R$^2$" is a C1-10 hydrocarbonylene group, "X" is a nitrogen atom; and "n" is an integer having a value from 1 to 4, said elastomer being present in an amount in the range of from about 2 to about 20% wt and said additive (C) being present in an amount in the range of from about 0.01 to about 5 weight percent, based on the total bituminous composition; and (i) a filler selected from the group consisting of talc, calcium carbonate and carbon black.

14. The roofing felt of claim 13 wherein the elastomer component (B) comprises at least two terminal blocks of a poly(monovinylaromatic hydrocarbon) and at least one block of one or more conjugated idenes or a partially hydrogenated version thereof, "R$^1$" is C2 hydrocarbonylene and "R$^2$" is C6 hydrocarbonylene.

15. A process for preparing a bituminous composition comprising admixing a bituminous component (A), at least one elastomer component (B) selected from the group consisting of polydienes, copolymers of dienes with a monovinylaromatic hydrocarbon, polyacrylates, polysulfides, polysilicones and polyesteramides having elastomeric behavior, and an additive (C), wherein the additive is a compound of the general formula:

$$Ar-R-Ar \quad (I)$$

wherein each "Ar" independently is a benzene ring or fused aromatic ring system of 6 to 20 carbon atoms, substituted by at least one hydroxyl group, and "R" is represented by the general formula:

$$-R^1C(=O)X-R^2XC(=O)R^1- \quad (V)$$

wherein each "R$^1$" is a C1-4 hydrocarbonylene group, "R$^2$" is a C1-10 hydrocarbonylene group, and "X" is a nitrogen atom; and "n" is an integer having a value from 1 to 4, said elastomer being present in an amount in the range of from about 2 to about 20% wt and said additive (C) being present in an amount in the range of from about 0.01 to about 5 weight percent, based on the total bituminous composition.

16. The process of claim 15 wherein the elastomer component and the additive are admixed with each other prior to being admixed with the bituminous component and wherein the elastomer component (B) comprises at least two terminal blocks of a poly(monovinylaromatic hydrocarbon) and at least one block of one or more conjugated idenes or a partially hydrogenated version thereof, "R$^1$" is C2 hydrocarbonylene and "R$^2$" is C6 hydrocarbonylene.

17. A composition useful for preparing or repairing roofs, said composition comprising (i) a bituminous composition prepared by admixing a bituminous component (A), at least one elastomer component (B) selected from the group consisting of polydienes, copolymers of dienes with a monovinylaromatic hydrocarbon, polyacrylates, polysulfides, polysilicones and polyesteramides having elastomeric behavior, and an additive (C), wherein the additive is a compound of the general formula:

$$Ar-R-Ar \quad (I)$$

wherein each "Ar" independently is a benzene ring or fused aromatic ring system of 6 to 20 carbon atoms, substituted by at least one hydroxyl group, and "R" is represented by the general formula:

$$—R^1C(=O)X—R^2XC(=O)R^1— \qquad (V)$$

wherein each "$R^1$" is a C1-4 hydrocarbonylene group, "$R^2$" is a C1-10 hydrocarbonylene group, and "X" is a nitrogen atom; and "n" is an integer having a value from 1 to 4, wherein the elastomer component and the additive are admixed with each other prior to being admixed with the bituminous component for preparing or repairing roofs, said elastomer component being present in an amount in the range of from about 2 to about 20% wt and said additive (C) being present in an amount in the range of from about 0.01 to about 5 weight percent, based on the total bituminous composition; and (ii) a filler.

18. The composition of claim 17 wherein the elastomer component (B) comprises at least two terminal blocks of a poly(monovinylaromatic hydrocarbon) and at least one block of one or more conjugated idenes or a partially hydrogenated version thereof, "$R^1$" is C2 hydrocarbonylene and "$R^2$" is C6 hydrocarbonylene.

\* \* \* \* \*